INVENTOR
Kenneth G. Kreuter

BY Birch and Birch
ATTORNEYS

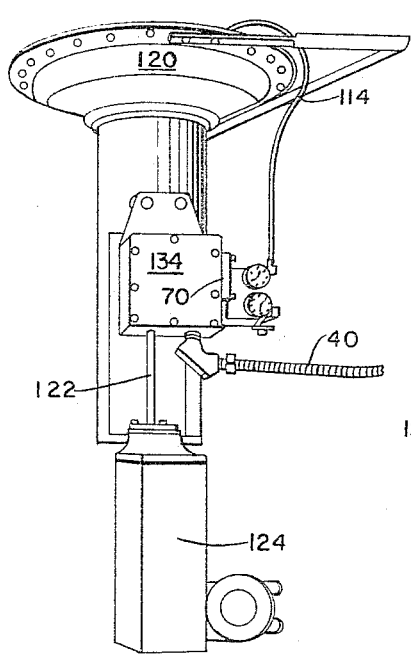
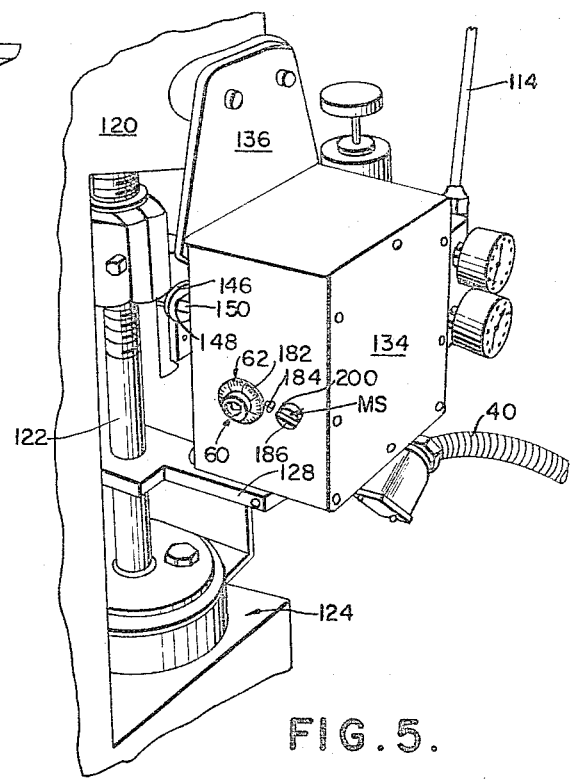
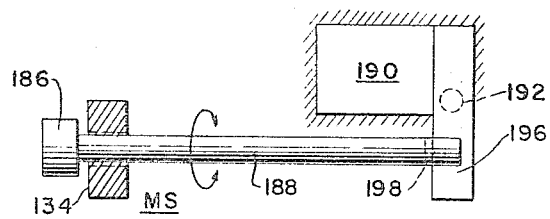
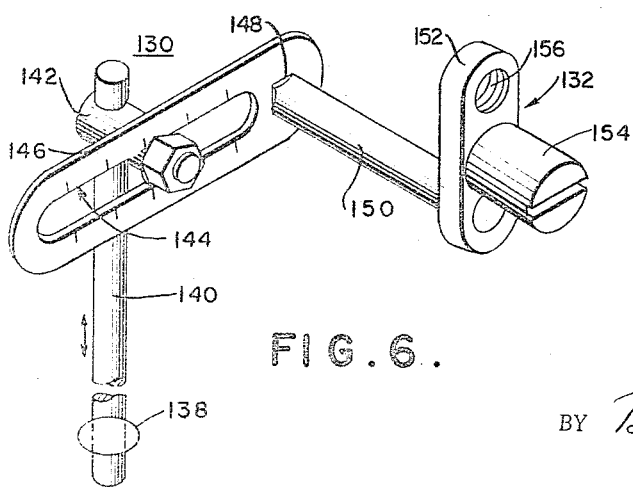
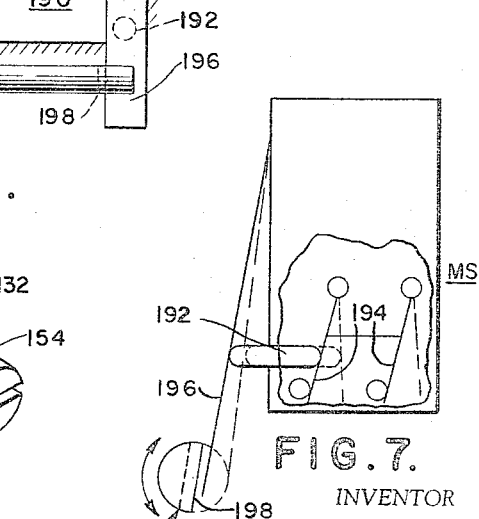

3,306,170
ELECTRO-PNEUMATIC PROCESS CONTROL SYSTEM FOR VALVES AND THE LIKE
Kenneth G. Kreuter, Goshen, Ind., assignor to Robertshaw Controls Company, Richmond, Va., a corporation of Delaware
Filed Sept. 23, 1964, Ser. No. 399,551
33 Claims. (Cl. 91—1)

This invention relates to electro-pneumatic control systems of the type converting a multiple state electric signal input into a pressure signal output utilized for pneumatically controlling valves and the like.

In dynamic control systems having integral computer means as the "brain" or monitor thereof, it is often necessary to convert electric output signals from the computer into a functionally related class of signals such as pressure and/or displacement.

The electric output signals from the computer are usually of the binary (bi-level) type, comprising pulses of a first polarity for a given state such as a unit ("1") state and pulses of a second polarity for the opposite state such as a zero ("0") state.

These pulses may be of constant duration or they may be duration modulated within the particular states; either of these types of modulation being readily achievable by starting with one such state and coupling the computer output signals through suitable transfer networks.

For the sake of example, this invention will be described in conjunction with the use of bi-level duration modulated pulse signals as the computer output signals, said signals appearing as constant amplitude, positive or negative polarity rectangular waveforms of variable duration. The pulse durations are representative of the degree of change of the controlled variable while the polarities are representative of the direction of change of the controlled variable.

It is an object of this invention to provide a process control system or the like for first performing an electropneumatic conversion and subsequently converting the resulting pneumatic signal into a displacement functionally related to both the electric and the pneumatic signals in the system.

It is another object of this invention to provide a process control system or the like wherein a duration-modulated binary electric output signal from a digital computer or the like is first converted to a control pressure and that control pressure is subsequently converted to a displacement, the displacement being imposed on a movable control means.

Still another object of this invention is to provide a process control system or the like wherein a duration-modulated binary electric output signal from a digital computer or the like is first converted to a control pressure and that control pressure is subsequently converted to a displacement, the displacement being imposed on a movable control means, said system including a novel intercoupled input drive and displacement feedback means, whereby said system is highly stable.

Yet another object of this invention is to provide a system for pneumatically positioning a control valve or other displaceable control means in response to a duration-modulated multiple-state electric signal.

It is an object of this invention to provide a pressure regulator means wherein a duration-modulated binary electric output signal from a digital computer or the like is first converted to a displacement and the said displacement subsequently converted to a functionally related control pressure.

It is another object of this invention to provide a pressure regulator means comprising a pneumatic relay and an electric stepping motor for modulating the pressure output of said relay, said stepping motor being driven through a displacement in response to a binary electric control signal.

Still another object of this invention is to provide a system for positioning a control valve or other displaceable control means in discreet quantized steps.

Yet another object of this invention is to provide a new and novel pressure regulator means.

These and other objects of this invention will become more fully apparent with reference to the following specification and drawings which relate to a preferred embodiment of the invention.

In the drawings:

FIGURE 4 is a front elevation of a valve positioner of the present invention;

FIGURE 5 is an enlarged detailed perspective of the automatic control portion of a valve positioner of the present invention;

FIGURE 6 is a detailed perspective of the feedback mechanism of the present invention;

FIGURE 7 is a schematic end view of a control switch embodied in the present invention; and FIGURE 8 is a schematic side elevation of the control switch of FIGURE 7.

Basically, the system of the present invention includes a computer output means providing a duration-modulated binary electric control signal; a transfer network receiving said control signal and producing a quantized control signal in response thereto, said quantized control signal comprising a train of energizing pulses of constant duration, the number of pulses representing and quantizing the duration of the particular state of the said control signal being transmitted from the computer output means to the said transfer network; a stepping motor driven through a rotary displacement in response to the quantized control signal; rotary-to-linear displacement converting means driven by the stepping motor; mechanical and electrical means providing visual and electrical output data as a function of said rotary displacement; pneumatic relay means modulated by said rotary-to-linear displacement converting means to provide a control pressure signal as a function of said duration-modulated binary electric control signal; utilization means displaced by said control pressure signal; and feedback means modulating the output displacement of said rotary-to-linear displacement converting means as a function of the displacement of said utilization means.

Figure 1:
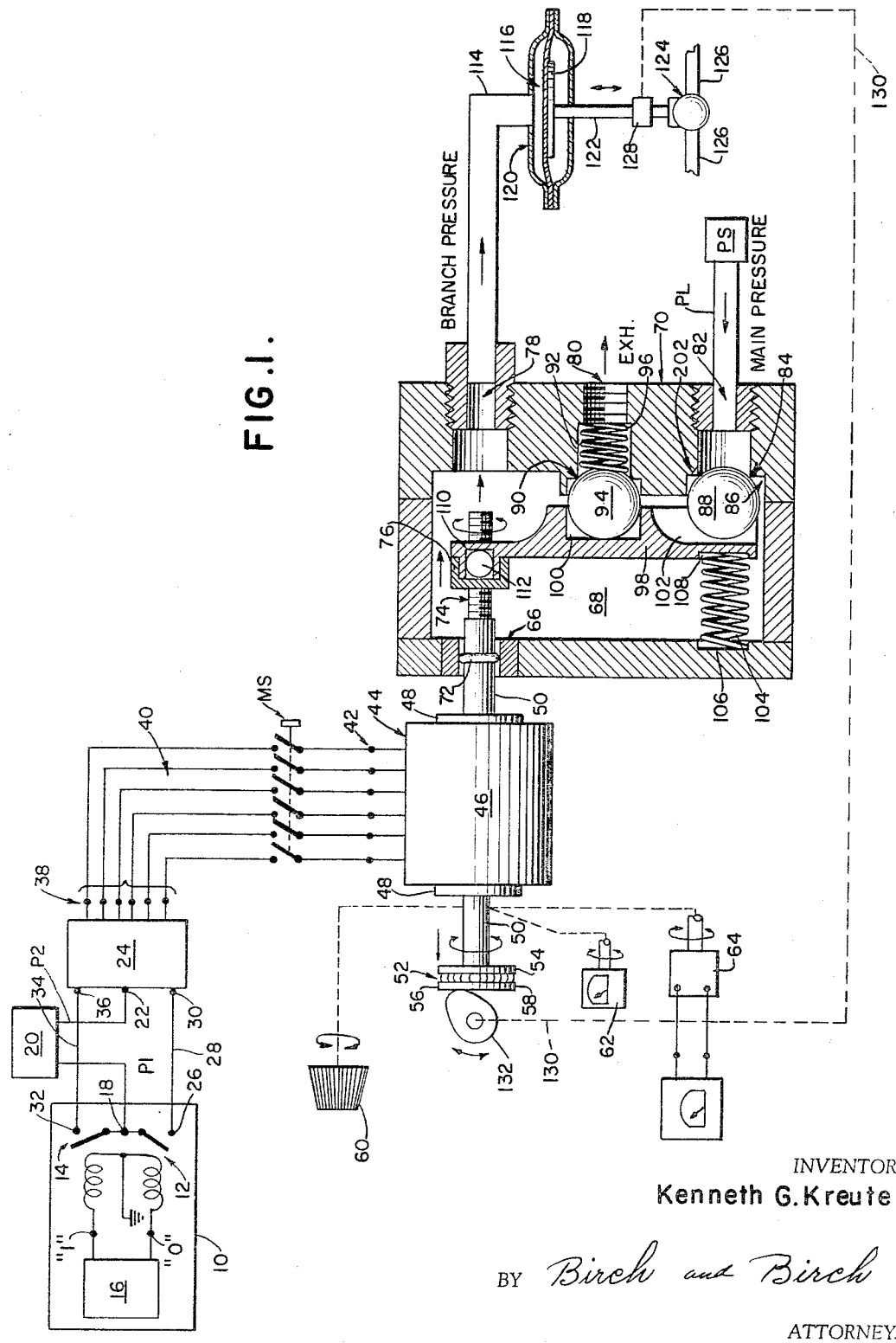
FIGURE 1 is a schematic diagram of a control system including the conversion and pressure regulating means of the present invention.

Referring in detail to the drawings, and more particularly to FIGURE 1, the system of the present invention is shown as including a digital computer output means 10 comprising first and second relay switches 12 and 14, respectively, representative of the two different states of a binary signal. The coils of the relay switches 12 and 14 are selectively energized by the binary output signal of a digital computer means 16, generally shown in block diagram form as having two output leads "1" and "0" representing the binary output states of the said computer 16.

The relay switches 12 and 14 are connected with a common terminal 18, to which is connected a first power lead P1 of a suitable direct current power supply 20. A second power lead 22, representing the other side of the power supply 20 is directly connected to the common or neutral input terminal 22 of a transfer network 24.

The first relay switch 12 is connected to respond to a zero state output from the computer terminal "0" and is provided with a terminal contact 26 connected, via a lead 28 to an input terminal 30 of the transfer network 24.

The second relay switch 14 is connected to respond to a unit state output from the computer terminal "1" and is provided with a contact terminal 32 connected, via a lead 34, to the remaining input terminal 36 of the transfer network 24.

The first relay switch 12 is connected to respond to a zero state output from the computer terminal "0" and is provided with a terminal contact 26 connected, via a lead 28 to an input terminal 30 of the transfer network 24.

The second relay switch 14 is connected to respond to a unit state output from the computer terminal "1" and is provided with a contact terminal 32 connected, via a lead 34, to the remaining input terminal 36 of the transfer network 24.

The transfer network 24 is provided with a plurality of output terminals 38 connected, respectively, via a like plurality of leads 40 with a like plurality of input terminals 42, respectively, on the stator 44 of a D.C. stepping motor 46.

A selective manual disconnect switch MS is provided in the leads 40 whereby the motor 46 may be selectively de-energized.

The stepping motor 46 includes a rotor 48 having an integral coaxial rotor shaft 50 extending from both ends thereof, said rotor shaft 50 being axially displaceable with said rotor 48 and rotatable therewith.

One end of the rotor shaft 50 terminates in a thrust bearing assembly 52 comprising a ball bearing race in a first coaxial, integral disk 54 on the said one end of the rotor shaft 50 and a free rotating second coaxial disk 56 separated from said first disk 54 by ball bearings 58.

The said one end of the rotor shaft 50 is mechanically coupled in mutual driving connection with a manual override means 60, an indicator means 62 and an electric transducer means 64 as will hereinafter before fully described.

The other end of the rotor shaft 50 extends through the bore of a journal bearing 66 in one wall of a branch pressure chamber 68 of a pneumatic relay means 70. A peripheral O-ring seal 72 is integrally mounted on the shaft 50 within the bore of the journal bearing 66 to prevent the escape of branch pressure through the said journal bearing.

The outermost portion of the said other end of the rotor shaft 50 comprises an output drive screw 74 on which is threaded an output coupling nut 76.

In a wall of the branch pressure chamber 68 opposite the journal bearing 66 there are provided a branch pressure output port 78, an exhaust port 80 and a main pressure supply port 82, the latter being connected with a main pressure supply PS via a main pressure lead PL.

The main pressure port 82 is provided with a valve seat 84 comprising the inner peripheral edge of a counterbored section 86 thereof inside the branch pressure chamber 68. A first spherical valve 88 is positioned immediately adjacent the valve seat 84 within the branch pressure chamber 68.

The exhaust port 80 is provided with a valve seat 90 comprising the inner peripheral edge of a counterbored section 92 thereof inside the branch pressure chamber 68. A second spherical valve 94 is positioned immediately adjacent the valve seat 90 within the branch pressure chamber 68. A compression spring 96 in the counterbored section 92 engages the second spherical valve 94 and biases same away from the valve seat 90.

The first and second spherical valves 88 and 94 are mutually constrained in position, respectively, adjacent the valve seats 94 and 90 by means of a relay actuating rocker arm 98, in the branch pressure chamber 68, having a cylindrical socket 100 therein receiving the second spherical valve 94 and a bifurcated converging wall recess 102 receiving the first spherical valve 88 in two-point contact therewith.

A compression spring 104 extending between a first internal socket 106 in the said one wall of the branch pressure chamber 68 and a second socket 108 in the rocker arm 98 in substantial registry with the supply port 82, expands coaxially of the said supply port 82 to bias the first spherical valve 88 toward the valve seat 84.

One end of the rocker arm 98 adjacent the second spherical valve 94 includes an integral bifurcated yoke portion 110 which receivably engages a drive pin 112 on the output coupling nut 76.

The branch pressure port 78 is connected through a pressure lead 114 with power chamber 116 on one side of a motor diaphragm means 118 in a valve topwork 120. The motor diaphragm means 118 is connected through a valve stem or other displacement output means 122 which is connected to a valve means 124 or the like to control the position thereof and regulate flow therethrough such as in the flow line 126 shown.

A feedback coupling 128 on the valve stem 122 is connected through a suitable feedback linkage 130 to drive a feedback cam 132 through an increment of displacement proportional to the output displacement of the valve stem 122.

In turn, the feedback cam 132 engages the second coaxial disk 56 of the thrust bearing assembly 52 on the rotor shaft 50 of the stepping motor 46 to impart an axial displacement to the rotor 48 and rotor shaft 50 as a function of the output displacement of the valve stem 122.

Figure 2:
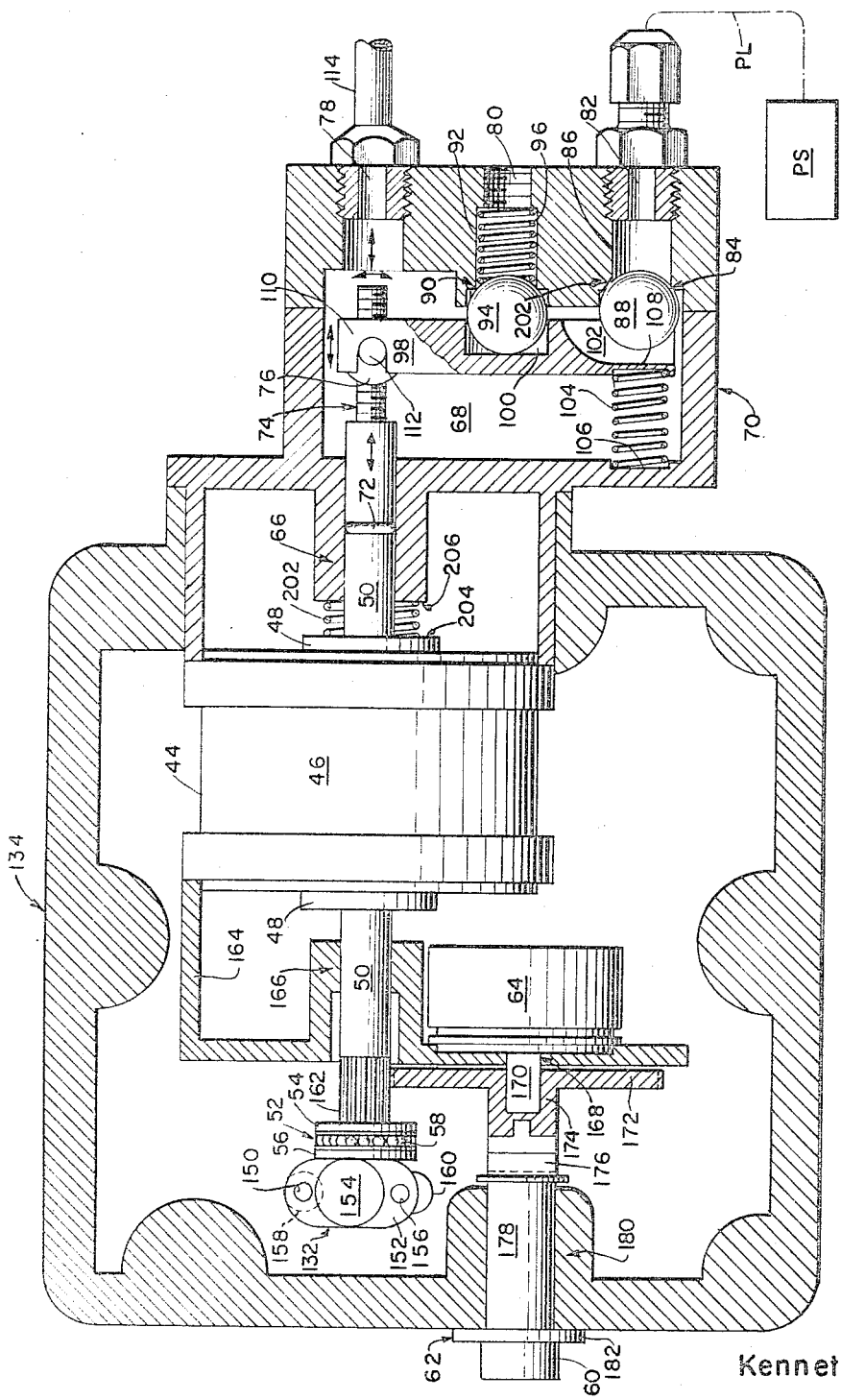
FIGURE 2 is a side elevation in partial cross-section of a preferred physical embodiment of the invention.
Figure 3:
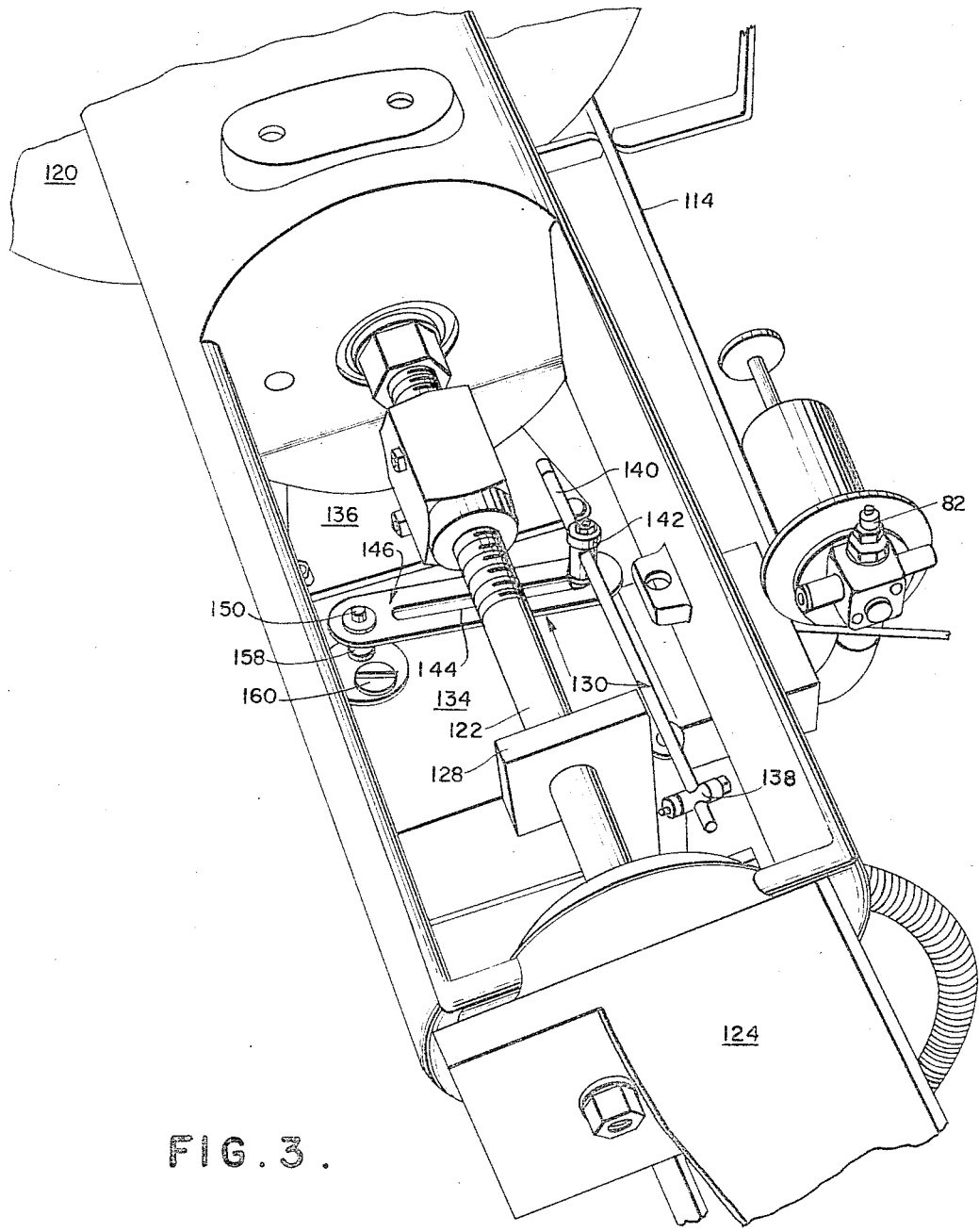
FIGURE 3 is a perspective of a valve positioner and feedback mechanism of the present invention.

Referring to FIGURES 2, 3 and 4, a specific preferred embodiment of the invention will now be described, like parts to the embodiment of FIGURE 1 bearing like numerals.

The stepping motor 46, the transducer 64 and the feedback cam 132 are enclosed in an explosion proof housing 134 which is mounted on the valve topwork 120 by means of a suitable bracket 136. The relay 70 is integrally attached to one wall of the housing 134.

The feedback linkage 130 is connected, referring to FIGURE 3, to the feedback coupling 128 on the valve stem 122 by means of a first swivel 138 extending laterally therefrom. The said feedback linkage 130, referring to FIGURES 3 and 6, comprises a displacement transmitting rod 140 connected at one end through the first swivel 138 and extending along the valve stem 122 through the second swivel 142 at its other end. The second swivel 142 is pivotally connected and longitudinally adjustable in the elongated, calibrated axial slot 144 extending from one end of a linear-to-rotary converting drive link 146 to a position adjacent the other end thereof. The other end of the drive link 146 is provided with a drive coupling bore 148 which receivably engages one end of a cam shaft 150 extending axially of the said coupling bore 148 and perpendicular to the plane of the drive link 146.

The cam shaft 150 is connected at its other end with one end of a radial link of eccentric 152 comprising an integral portion of the feedback cam 132. The cam 132 is completed by a cam stud 154 threaded into the face of the eccentric 152, the said stud 154 being radially offset and axially disposed with respect to the cam shaft 150.

Several threaded bores 156, radially offset in the eccentric 152 with respect to the cam shaft 150, are provided whereby the cam stud 154 may be selectively radially offset from the said cam shaft 150.

As shown in FIGURES 2 and 3, the cam shaft 150 extends through a journal bearing 158 in the rear wall of the housing 134. A second journal bearing 160 is provided as an alternative passage for the cam shaft 150 when an inverse (reverse action) control function is desired.

Referring to FIGURES 2 and 5, an output drive pinion 162 is pressed or integrally formed on the rotor shaft 50 immediately adjacent the thrust bearing means 52. A mounting panel 164 is provided integral with the casing of the stepping motor 46 and includes a journal bearing 166 for the rotor shaft 50 adjacent the drive pinion 162.

Below the journal bearing 166 is a second journal bearing 168 in which is mounted the input shaft 170 of the rotary transducer 64, the latter being of the rotary three terminal variable resistance type or other suitable displacement modulated function transducer.

A driven second pinion 172 is keyed or pressed on the transducer input shaft 170 and is interengaged with the drive pinion 162, whereby the said input shaft 170 is driven through a rotation proportional to a corresponding rotation of the rotor shaft 50.

The hub 174 of the second pinion 172 is axially connected through a drive coupling 176 with a control shaft 178 integral with the manual override means 60, the latter comprising a suitable knurled knob or Allen fitting. The control shaft 178 is journalled through a wall of the housing 134 in a suitable journal bearing 180.

The control shaft 178 comprises the input shaft of the mechanical indicating means 62 which comprises a coaxial dial 182 indexed with respect to a reference point or pin 184 on the outer wall of the housing 134.

Referring now to FIGURES 2, 5, 7 and 8, the manual control switch MS will be described. The switch MS is controlled by a knob or bolt head 186 on the external face of the outer wall of the casing 134 adjacent the manual override means 60 and mechanical indicator means 62. A coaxial switch operating shaft 188 extends through the housing 134 from the knob 186 to a position adjacent the body 190 of the switch MS, the said body 190 being mounted on the panel 164 or other integral portion of the stepping motor 46 within the housing 134.

A thrust button 192 engaging a plurality of ganged, spring type, single throw contacts 194, as schematically shown in FIGURE 7, causes operation of the switch MS.

The thrust button 192 is operated by a leaf spring actuator 196 which is spring pivoted at one end and selectively engaged at its other end by a camming flat 198 machined or otherwise formed in the inner end of the operating shaft 188.

The switch assembly MS is completed by an index mark 200 (FIGURE 5) on the face of the control knob 186 which is adapted to be placed in selective registry with the indicia A (automatic) and M (manual) for the two modes of operation of the present invention as will be hereinafter more fully described.

Referring again to FIGURE 2, the control function of the relay 70 is enhanced in accuracy and precision by the use of metal-to-metal contact between the first and second spherical valves 88 and 94 and the respectively associated valve seats 84 and 96 which are formed integrally with the bores 86 and 92, respectively.

Close tolerance metal-to-metal contact in a pneumatic valve means often results in a tendency for the valve to stick on the valve seat and impair the operation thereof.

The second spherical valve 94 is adequately compensated against this condition by the compression spring 96 in the bore 92 of the exhaust port 80.

In the case of the first spherical valve 88, a minute pressure leak or bleed is built into the valve seat 84 such as by a deliberate notch or scratch 202 formed in the said valve seat 84. This prevents sticking and provides substantially immediate response of the first spherical valve 88 to pressure differentials thereacross.

As will be further described in conjunction with the description of operation of the invention herein, additional bias means is provided, as shown in FIGURE 2, to assist the feedback and rebalancing mechanisms of the subject invention in overcoming the inertia of the motor rotor 48 and rotor shaft 50 in the form of a compression spring 204 coaxial with the rotor shaft 50 between an end face 206 of the rotor 48 and an end face 208 of the journal bearing 66.

Operation

Referring first to FIGURE 1, the operation of the system schematically shown therein is as follows:

Assuming first that the rotor shaft 50 of the stepping motor 46 is in a position of rotation intermediate the limits of the output stroke of the valve stem 122 and motor diaphragm 118, output pulses from the computer output 10 will cause the transfer network 24 to deliver corresponding energizing pulse signals to the input terminals 42 of the stepping motor 46. These signals will cause a quantized rotation of the rotor 48 and rotor shaft 50 for each individual pulse signal, thus "stepping" the rotor 48 through a rotational displacement determined by the number of input pulses applied, the direction of rotation being selected as a function of the state of the signals from the computer output 10 by means of suitable sequencing means, not shown, integral within the transfer network 24.

Each quantized rotation of the rotor 48 is imparted to the rotor shaft 50 which causes the threaded portion 74 thereof to thread in and out of the threaded output coupling nut 76 in the branch pressure chamber 68 of the pneumatic control relay 70.

Assuming, for example, a rotation of the rotor shaft 50 which causes the coupling nut 76 to move out on the rotor shaft 50 away from the stepping motor 46, the coupling pin 112 thereon will constrain the relay arm 98, via the bifurcated yoke portion 110, to pivot on the second spherical valve 94 against the action of the compression spring 104, thereby holding the same on the second valve seat 90 and closing the exhaust port 80, while permitting the main supply pressure from the pressure source PS to unseat the first spherical valve 88 and admit supply pressure to the branch pressure chamber 68 via the supply port 82.

This results in an increase in the magnitude of the branch pressure which is transmitted via the output port 78 and lead 114 to the power chamber 116 in the valve topwork 120. The motor diaphragm 118 and valve stem 122 are thus forced downward to initiate a modulating displacement of the valve means 124 and a resulting modulation of the fluid flow in the line 120. The valve topwork 120 comprises a conventional pressure operated diaphragm motor biased to move the valve stem 122 upward in response to a decrease in the pressure in the power chamber 116.

As the valve stem 122 is displaced, this displacement is imparted through the feedback coupling 128 to the feedback linkage 130 which rotates the feedback cam 132. The rotation of the feedback cam 132, in response to a downward direction of displacement of the valve stem 122, will cause the camming surface thereof to move axially away from the outer disk 56 of the thrust bearing 52.

This will permit the stored energy in the compression spring 104 to force the relay arm 98 counterclockwise about the pivot comprising the second spherical valve 94, forcing the first spherical valve 88 towards the valve seat 84 and simultaneously constraining the rotor shaft 50 and rotor 48 of the stepping motor 46 through an axial displacement to follow the feedback cam 132, thereby maintaining the outer disk 56 of the thrust bearing 52 in contact with the said feedback cam. This action continues until the valve stem 122 and the valve 124 have been sufficiently displaced to satisfy the input constraint placed on the entire system by the signals from the computer output 10.

When the input constraint has been satisfied, the axial displacement of the rotor 48 and rotor shaft 50 will have been axially displaced sufficiently to permit the first spherical valve 88 to seat on the valve seat 84 and prevent further influx of supply pressure into the branch pressure chamber 68. Thus, the branch pressure will remain constant and a valve positioning cycle of the system will be completed.

In the event of a reverse rotation of the rotor 48 from the above-described operation, the coupling nut 76 will move inward on the rotor shaft 50 toward the stepping motor 46. This permits the relay arm 90 to be pivoted about the first spherical valve 88 by the action of the compression spring 104 and bias spring 96, thereby seating the said first spherical valve 88 on the valve seat 84 and permitting the second spherical valve 94 to be lifted from the valve seat 90 of the exhaust port 80. This exhausts the branch pressure in the branch pressure chamber 68 to atmosphere via the exhaust port 80 until such time as the resulting upward displacement of the valve stem 122 causes the feedback linkage 130 and feedback cam 132 to shift the rotor 48, rotor shaft 50, coupling nut 76, coupling pin 112 and relay arm 98 back to a condition of balance which satisfies the imposed constraint for a predetermined upward displacement of the valve stem 122.

In the event that a constraint is to be placed on the system via the manual override control knob 60, the manual control switch MS will be actuated to remove the power input from the stepping motor 46 and the knob 60 manually rotated to impart rotation to the rotor shaft 50 and rotor 48, whereby the same output displacement and feedback functions will occur as in the case when an electrical constraint was applied via the computer output terminal 10.

In both manual and automatic conditions of operation, the position of rotation of the rotor shaft 50 is read out on the mechanical indicator means 62 and the transducer means 64 is modulated as a function of the said position of rotation of the rotor shaft 50 for purposes of remote readout or other control functions.

Referring now to FIGURES 2, 3, 4, 5, 6, 7 and 8 the operation of the preferred physical embodiment shown therein is as follows:

With the operation of like numbered elements of FIGURE 1 being identical, the output displacement of the valve stem 122 causes the transmitting rod 140 of the feedback mechanism 130 to undergo a like displacement which, because of the mounting thereof in the swivels 138 and 142 causes a proportional rotation of the drive link 146 and a corresponding rotation of the cam shaft 150. Thus, the radial eccentric 152 constrains the cam stud 154 to move toward or away from the outer disk 56 of the thrust bearing 52 on the rotor shaft 50, whereby the said rotor shaft 50 and rotor 48 are constrained through an axial displacement as a function of the output displacement of the valve stem 122.

As a further result, the relay arm 98 is constrained to a balanced condition in which an input constraint placed on the system is satisfied.

Rotation of the rotor shaft 50 causes the integral drive pinion 162 to drive the driven pinion 172 and thus position the dial 182 of the mechanical indicator means 62 for local readout of the position of the rotor shaft 50 and hence, the condition of the valve 124, as well as to modulate the transducer 64 via its rotary input shaft 170.

As specifically shown in FIGURES 5, 7 and 8, turning the control knob 186 of the manual control switch MS to a position in which the index mark 200 is in registry with the letter A on the housing 134 places the switch contacts 94 in the closed (solid line) position shown in FIGURE 7. When the index mark 200 is in registry with the letter M on the housing 134, the flat 198 on the control shaft 188 engages the spring leaf actuator 196 and forces it into the push button actuator 192 to force the switch contacts 194 into the open (dotted line) position shown in FIGURE 7.

Referring now to FIGURES 3 and 6, the feedback linkage 130 is selectively adjustable for various full stroke operating ranges of the valve 124 and valve stem 122 in two ways. First, for longer stroke operation, the cam stud 154 is located close to the axis of rotation of the cam shaft 150 in the radial eccentric 152 and for shorter stroke operation in the outer threaded bore 156 in the said radial eccentric.

Further adjustment is made by selectively positioning the upper swivel 142 along the axial slot 144 in the drive link 146.

The above-defined adjustments make possible the same axial displacement of the rotor shaft 50 for like percents of full stroke displacement for various valve stem stroke lengths, whereby the system of the present invention is readily calibrated and adaptable to a wide range of valve stroke lengths.

In all of the foregoing cases, modulation of all of the process parameters is effected in a series of discrete quantized steps in response to a binary or other multiple state input signal such as duration modulated binary signals.

As can be seen from the foregoing specification and drawings, this invention provides a new and novel valve positioning system which is digitally controlled and capable of high accuracy and precision with an optimally minimum number of working parts. Further, there is provided a new and novel electric-to-pneumatic signal converting or pressure regulating means and new and novel feedback and self-balancing means for pneumatic relays and the like.

It is to be understood that the specific preferred embodiments shown and described herein are for the purpose of example only and are not intended to limit the scope of the appended claims.

What is claimed is:

1. Means providing a regulated output displacement as a function of a modulated multiple state electric signal comprising control means generating a modulated multiple state electric signal; transfer means responsive to said signal providing a plurality of stepping pulses as a function of said electric signal; electric motor means including displaceable means energized by said stepping pulses through an equal increment of displacement for each of said pulses; output means driven by said motor means through said equal increments of displacement; pneumatic relay means including displaceable control pressure modulating means and a control pressure output; means interconnecting said displaceable pressure modulating means and said output means causing said displaceable pressure modulating input means to modulate the value of control pressure at said control pressure output as a function of said multiple state signal; displaceable pressure actuated means connected with said control pressure output and constrained through a regulated output displacement by said control pressure as a function of said modulated multiple state electric signal; and feedback means interconnected between said pressure actuated means and said output means effecting a compensating feedback displacement of said output means and said control pressure modulating input means as a function of said regulated output displacement.

2. Means providing a regulated output displacement as a function of a modulated multiple state electric signal comprising control means generating a modulated multiple state electric signal; transfer means responsive to said signal providing a plurality of stepping pulses as a function of said electric signal; electric motor means including displaceable means energized by said stepping pulses through an equal increment of rotary displacement for each of said pulses; output means driven by said motor means through equal increments of linear displacement corresponding to said increments of rotary displacement; pneumatic relay means including displaceable control pressure modulating means and a control pressure output; means interconnecting said displaceable pressure modulating means and said output means causing said displaceable pressure modulating means to modulate the value of control pressure at said control pressure output as a function of said modulated multiple state signal; displaceable pressure actuated means constrained through a regulated output displacement by said control pressure as a function of said modulated multiple state signal; and feedback means interconnected between said pressure actuated means and said motor means effecting a compensating linear feedback displacement of said motor means, said output means and said control pressure modulating means as a function of said regulated output displacement.

3. The invention defined in claim 2, wherein said pneumatic relay means further includes a control pressure chamber, connected with said control pressure output, a pressure input port and an exhaust port; and wherein said displaceable control pressure modulating means comprises first and second valve means in said pressure input and exhaust ports, respectively, and valve actuating means in said control pressure chamber engaged with said valve means and interconnected with said output means selectively pivoted on one of said valve means in response to a displacement of said output means.

4. The invention defined in claim 2, wherein said pneumatic relay means further includes a control pressure chamber connected with said control pressure output, a pressure input port and an exhaust port; and wherein said displaceable control pressure modulating means comprises first and second valve means in said pressure input and exhaust ports, respectively, valve actuating lever means in said control pressure chamber engaged with said valve means, first bias means constraining said first valve means to close said inlet port and second bias means constraining said second valve means to open said exhaust port, said lever means being connected at one end to said output means and selectively pivoted on one of said valve means in response to a displacement of said output means.

5. The invention defined in claim 4, wherein said first and second valve means comprise first and second metal spheres, respectively, and wherein said inlet and exhaust ports include first and second metal valve seats, respectively, in metal-to-metal contact with said metal sphere.

6. The invention defined in claim 5, wherein said first valve seat includes pressure bleed means bypassing said first metal sphere.

7. The invention defined in claim 2, wherein said motor means comprises an electric motor rotor, including an integral axial shaft, journaled for rotary and linear axial displacement in response to said stepping pulses and said feedback means, respectively.

8. The invention defined in claim 2, wherein said motor means comprises an electric motor rotor, including an integral axial shaft, journaled for rotary and linear axial displacement in response to said stepping pulses and said feedback means, respectively; and wherein said output means comprises a coupling nut threaded on one end of said axial shaft and constrained against rotation, said coupling nut being driven through a linear displacement in response to rotary and linear axial displacement of said motor means.

9. The invention defined in claim 2, wherein said feedback means comprises a drive link connected with said pressure actuated means and displaced thereby through said regulated output displacement, a feedback cam means engaging said motor means and imparting said compensating linear feedback displacement thereto, and a connecting link interconnecting said drive link and said feedback cam means.

10. The invention defined in claim 2, wherein said feedback means comprises a drive link connected with said pressure actuated means and displaced thereby through said regulated output displacement, feedback cam means engaging said motor means and imparting said compensating linear feedback displacement thereto, and a connecting link interconnecting said drive link and said feedback cam means; said connecting link including first adjustable means selectively adapting said feedback means to various full-range magnitudes of said regulated output displacement and said feedback cam means including second adjustable means selectively adapting said feedback means to said various full-range magnitudes of said regulated output displacement.

11. The invention as defined in claim 2, wherein said motor means comprises an electric motor rotor, including an integral axial shaft, journaled for rotary and linear axial displacement in response to said stepping pulses and said feedback means, respectively; and thrust bearing means on one end of said axial shaft; and wherein said feedback means comprises a drive link connected with said pressure actuated means and displaced thereby through said regulated output displacement, a feedback cam means engaging said thrust bearing means and imparting said compensating linear feedback displacement therethrough axially of said shaft, and a connecting link interconnecting said drive link and said feedback cam means.

12. The invention defined in claim 2, wherein said motor means comprises an electric motor rotor, including an integral axial shaft, journaled for rotary and linear axial displacement in response to said stepping pulses and said feedback means, respectively; and thrust bearing means on one end of said axial shaft; and wherein said feedback means comprises a drive link connected with said pressure actuated means and displaced thereby through said regulated output displacement, a feedback cam means engaging said thrust bearing means and imparting said compensating linear feedback displacement therethrough axially of said shaft, and a connecting link interconnecting said drive link and said feedback cam means; said connecting link including first adjustable means selectively adapting said feedback means to various full-range magnitudes of said regulated output displacement and said feedback cam means including second adjustable means selectively adapting said feedback means to said various full-range magnitudes of said regulated output displacement.

13. The invention defined in claim 2, wherein said motor means comprises an electric motor rotor, including an integral axial shaft, journaled for rotary and linear axial displacement in response to said stepping pulses and said feedback means, respectively; wherein said output means comprises a coupling nut threaded on one end of said axial shaft and constrained against rotation, said coupling nut being driven through a linear displacement in response to rotary and linear axial displacement of said motor means; wherein said axial shaft further includes thrust bearing means on the other end thereof; wherein said pneumatic relay means further includes a control pressure chamber connected with said control pressure output, a pressure input port and an exhaust port; wherein said displaceable control pressure modulating means comprises first and second valve means in said pressure input and exhaust ports, respectively, and valve actuating means in said control pressure chamber engaged with said valve means and interconnected with said output means selectively pivoted on one of said valve means in response to a displacement of said output means; and wherein said feedback means comprises a drive link connected with said pressure actuated means and displaced thereby through said regulated output displacement, a feedback cam means engaging said thrust bearing means and imparting said compensating linear feedback displacement therethrough axially of said shaft, and a connecting link interconnecting said drive link and said feedback cam means.

14. The invention defined in claim 13, wherein said connecting link includes first adjustable means selectively adapting said feedback means to various full-range magnitudes of said regulated output displacement and said feedback cam means including second adjustable means selectively adapting said feedback means to said various full-range magnitudes of said regulated output displacement.

15. The invention defined in claim 13, wherein said pneumatic relay means further includes first bias means constraining said first valve means to close said inlet port and second bias means constraining said second valve means to open said exhaust port, said valve actuating means being connected at one end to said output means and selectively pivoted on one of said valve means in response to a displacement of said output means.

16. The invention defined in claim 15, wherein said first and second valve means comprise first and second metal spheres, respectively, and wherein said inlet and exhaust ports include first and second metal valve seats, respectively, in metal-to-metal contact with said metal spheres.

17. The invention defined in claim 16, wherein said first valve seat includes pressure bleed means bypassing said first meal sphere.

18. The invention defined in claim 13, wherein said connecting link includes first adjustable means selectively adapting said feedback means to various full-range magnitudes of said regulated output displacement and said feedback cam means including second adjustable means selectively adapting said feedback means to said various full-range magnitudes of said regulated output displacement; and wherein said pneumatic relay means further includes first bias means constraining said first valve means to close said inlet port and second bias means constraining said second valve means to open said exhaust port, said valve actuating means being connected at one end to said output means and selectively pivoted on one of said valve means in response to a displacement of said output means.

19. The invention defined in claim 18, wherein said first and second valve means comprise first and second metal spheres, respectively, and wherein said inlet and exhaust ports include first and second metal valve seats, respectively, in metal-to-metal contact with said metal spheres.

20. The invention defined in claim 19, wherein said first valve seat includes pressure bleed means bypassing said first metal sphere.

21. The invention defined in claim 2 wherein said means further includes readout means mechanically coupled with said motor means.

22. For use in a control system effecting a regulated output displacement as a function of an electric control signal from a digital computer means, the combination of a rotary stepping motor including rotor means constrained through a rotary displacement as a function of said electric signal; output means on said rotor means constrained to provide a displacement axially of said rotor means as a function of said rotary displacement, displaceable means controlled by said output means providing a regulated output displacement; and feedback means interconnected between said displaceable means and said rotor means imparting a compensating axial feedback displacement to said rotor means and said output means.

23. The invention defined in claim 22, wherein said displaceable means includes a pneumatic relay means comprising a control pressure chamber, including said output means, connected with a control pressure output, and a displaceable control pressure modulating means in said chamber connected with said output means.

24. The invention defined in claim 23, wherein said pneumatic relay means further includes a control pressure chamber connected with said control pressure output, a pressure input port and an exhaust port; and wherein said displaceable control pressure modulating means comprises first and second valve means in said pressure input and exhaust ports, respectively, and valve actuating means in said control pressure chamber engaged with said valve means and interconnected with said output means selectively pivoted on one of said valve means in response to a displacement of said output means.

25. The invention defined in claim 23, wherein said pneumatic relay means further includes a control pressure chamber connected with said control pressure output, a pressure input port and an exhaust port; and wherein said displaceable control pressure modulating means comprises first and second valve means in said pressure input and exhaust ports, respectively, valve actuating lever means in said control pressure chamber engaged with said valve means, first bias means constraining said first valve means to close said inlet port and second bias means constraining said second valve means to open said exhaust port, said lever means being connected at one end to said output means and selectively pivoted on one of said valve means in response to a displacement of said output means.

26. The invention defined in claim 25, wherein said first and second valve means comprise first and second metal spheres, respectively, and wherein said inlet and exhaust ports include first and second metal valve seats, respectively, in metal-to-metal contact with said metal spheres.

27. The invention defined in claim 26, wherein said first valve seat includes pressure bleed means bypassing said first metal sphere.

28. The invention defined in claim 22, wherein said feedback means comprises a drive link connected with said displaceable means and displaced thereby through said regulated output displacement, a feedback cam means engaging said rotor means and imparting said compensating axial feedback displacement thereto, and a connecting link interconnecting said drive link and said feedback cam means.

29. The invention defined in claim 28, wherein said connecting link and said feedback cam means further include, respectively, first and second adjustable means selectively adapting said feedback means to various full-range magnitudes of said regulated output displacement of said displaceable means.

30. The invention defined in claim 22, wherein said feedback means further includes adjustable means selectively adapting said feedback means to various full-range magnitudes of said regulated output displacement of said displaceable means.

31. The invention defined in claim 22, wherein said combination further includes readout means mechanically coupled with said rotor means.

32. Transducer means effecting a regulated output displacement in response to an electric control signal from a digital computer means comprising electric motor means including armature means constrained through a displacement in response to an electric control signal applied to said motor means from a digital computer means, pressure regulator means including pressure control means displaceable by said armature means effecting a pressure output signal in response to a displacement of said armature means, pressure operated displaceable means displaceable in response to said pressure output signal, and feedback means interconnected with said displaceable means and said armature means superimposing a compensating displacement on said pressure control means through said armature means to effect a position balance between the position assumed by said displaceable means and the constraint imposed on said motor means by said electric control signal.

33. Transducer means effecting a regulated output displacement in response to an electric control signal from a digital computer means comprising electric stepping motor means including a rotor constrained through a rotary displacement in response to an electric control signal applied to said motor means from a digital computer means, output means on said rotor means, pressure regulator means including pressure control means displaceable by said output means in response to a displacement of said rotor means effecting a pressure output signal in response to a displacement of said rotor means, displaceable means displaceable in response to said pressure output signal, and feedback means interconnected with said displaceable means and said rotor means superimposing a compensating axial displacement on said rotor means to provide a compensating displacement of said pressure control means and effect a position balance between the position assumed by said displaceable means and the constraint imposed on said motor means by said electric control signal.

References Cited by the Examiner

UNITED STATES PATENTS

| | | | |
|---|---|---|---|
| 2,237,400 | 4/1941 | Washburn | 91—380 |
| 2,789,543 | 4/1957 | Popowsky | 91—387 |
| 2,985,808 | 12/1959 | Katchledge | 318—20.209 |
| 3,038,449 | 6/1962 | Murphy et al. | 91—363 |
| 3,139,005 | 6/1964 | Evans | 91—380 |

FOREIGN PATENTS 390,150    1/1922    Germany.

EDGAR W. GEOGHEGAN, *Primary Examiner.*

PAUL E. MASLOUSKY, *Examiner.*